Feb. 20, 1934.   C. E. SIEGFRIED   1,948,011
APPARATUS FOR VULCANIZING A MOLDED STRIP
Filed Feb. 21, 1930
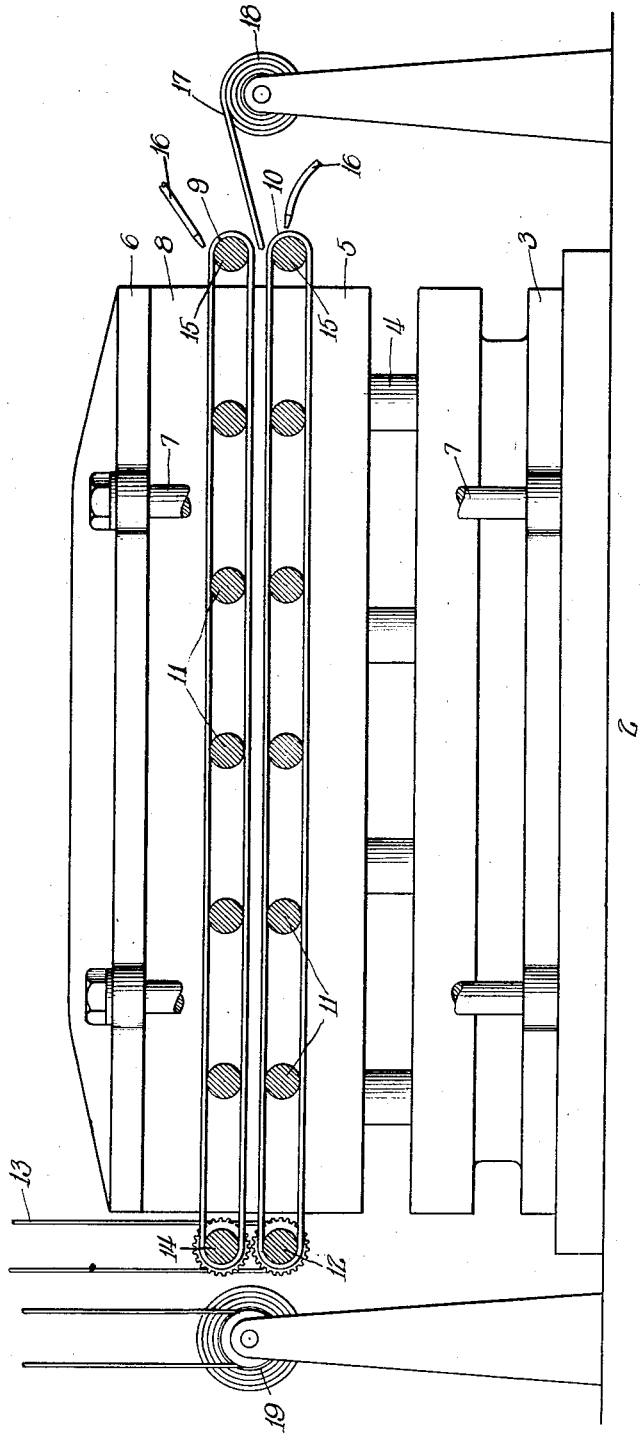
Inventor:-
Clarence E. Siegfried
By Albert E. Robinson
Atty.

Patented Feb. 20, 1934

1,948,011

UNITED STATES PATENT OFFICE 1,948,011

APPARATUS FOR VULCANIZING A MOLDED STRIP

Clarence E. Siegfried, Sandusky, Ohio, assignor, by mesne assignments, to Construction Materials Patents, Inc., a corporation of Ohio Application February 21, 1930. Serial No. 430,269

4 Claims. (Cl. 18—17)

This invention relates to the manufacture of vulcanized products by a continuous process, and particularly pertains to the fabrication of strips by continuously feeding them from a source of supply through a vulcanizer. Thereafter the strips may be rolled or divided in suitable lengths and stacked.

Heretofore, means have been provided on vulcanizing equipment for moving the articles to be molded in and out of the press, before and after the articles are vulcanized. This means usually comprises a table or plate on which the articles to be molded are laid, after which the table or plate with the articles thereon is moved between the platens and vulcanized. While, of course, the table or plate is convenient for moving the article to and from the press, its use in no way effects the process of vulcanization, as the table or plate as well as the articles thereon, are stationary during vulcanization. One set of articles to be molded is fed to the press and vulcanized, and then these are replaced by a second batch and so on.

The present invention contemplates a continuous movement of the articles between the platens so that they may be vulcanized without loss of time and without actuation of the platens at each curing operation. Means are provided on the apparatus whereby the sheets may be continuously fed thru the vulcanizer and delivered in continuous sheets which may be subdivided into desired lengths.

The single figure is an elevation view, partly broken away, of one side of a vulcanizer embodying the present invention.

Referring to the drawing, numeral 2 designates a gang press which in general construction is conventional. It comprises a cylinder base 3 in which a series of separate hydraulic cylinders or rams 4 may be operated from a single water line to move a steam heated plunger or plungers 5 to and from head 6. The head is supported on vertical standards 7 and faced on the underside with a platen 8, which may also be steam heated.

Means in the form of conveyors 9 and 10 are arranged to revolve between the platens over a series of idle rollers 11. One of the end rollers 12 may be advantageously driven from a source of power by means of the power transmitting belt 13, and preferably this driven roller may contact with a similar roller 14 on the other conveyor so that both conveyors may be driven by a single means. One set of rollers is attached to the head of the press, and the other set is attached to the plunger head. Rollers 15 are preferably positioned on the ends of the press to project the conveyors beyond the faces of the platens, whereby they may be conveniently dusted by means of conduits 16 through which dusting material is supplied.

The strip 17 of rubber stock is continuously fed through the press between the conveyors from a supply roll 18 or other source, during which movement vulcanization is effected, and the cured strip is then wound in a roll 19 or otherwise packed. The winding roll will be operated synchronously with the conveyor pulleys, and preferably from the same source of power, so that all may move at even speed.

It will be appreciated that the conveyors operating between the platens will be subject to high temperatures, and, therefore, should be constructed of material capable of functioning in this condition. I have found flexible metal belts especially suitable for the purpose as they are good conductors of heat and accelerate vulcanization as well as cooperating to effect smooth surfaces of the strip.

Altho the present invention is especially suitable for curing relatively thin strips, it will be understood that it may also be employed for curing thick strips. The speed of the strip thru the vulcanizer may be regulated to allow sufficient time to effect vulcanization of the strip during its subjection to the press.

By this process, the platens may be adjusted and the strip fed thru the press continuously, thereby saving time and keeping the press at a more uniform temperature than when it is operated at intervals.

Altho I have shown only one specific apparatus for illustrating my invention and showing how same may be carried out, it will be understood that various changes in detail may be made.

I claim:

1. An apparatus for vulcanizing a molded strip comprising a pair of heated platens, conveyor means traversing entirely within a predetermined path between the platens for supporting the strip and means for actuating the conveyor to feed the strip between the platens.

2. An apparatus for vulcanizing a molded strip comprising a pair of heated platens, a conveyor device traversing entirely in a predetermined path between the platens which a strip is supported adjacent the platens, and means for actuating the conveyor to feed the strip between the platens.

3. An apparatus for vulcanizing a molded strip comprising a pair of heated platens, an endless conveyor associated with each series of rollers and traversing entirely within a predetermined path between the platens to feed a strip therebetween, and means for synchronously actuating the conveyors.

4. An apparatus for vulcanizing a molded strip comprising a pair of heated platens, a pair of endless conveyors attached to each of the platens and traversing entirely within a predetermined path between said platens, means for actuating the conveyors to feed a strip therebetween, and means for dusting the surface of the conveyors.

CLARENCE E. SIEGFRIED.